Patented Nov. 26, 1935

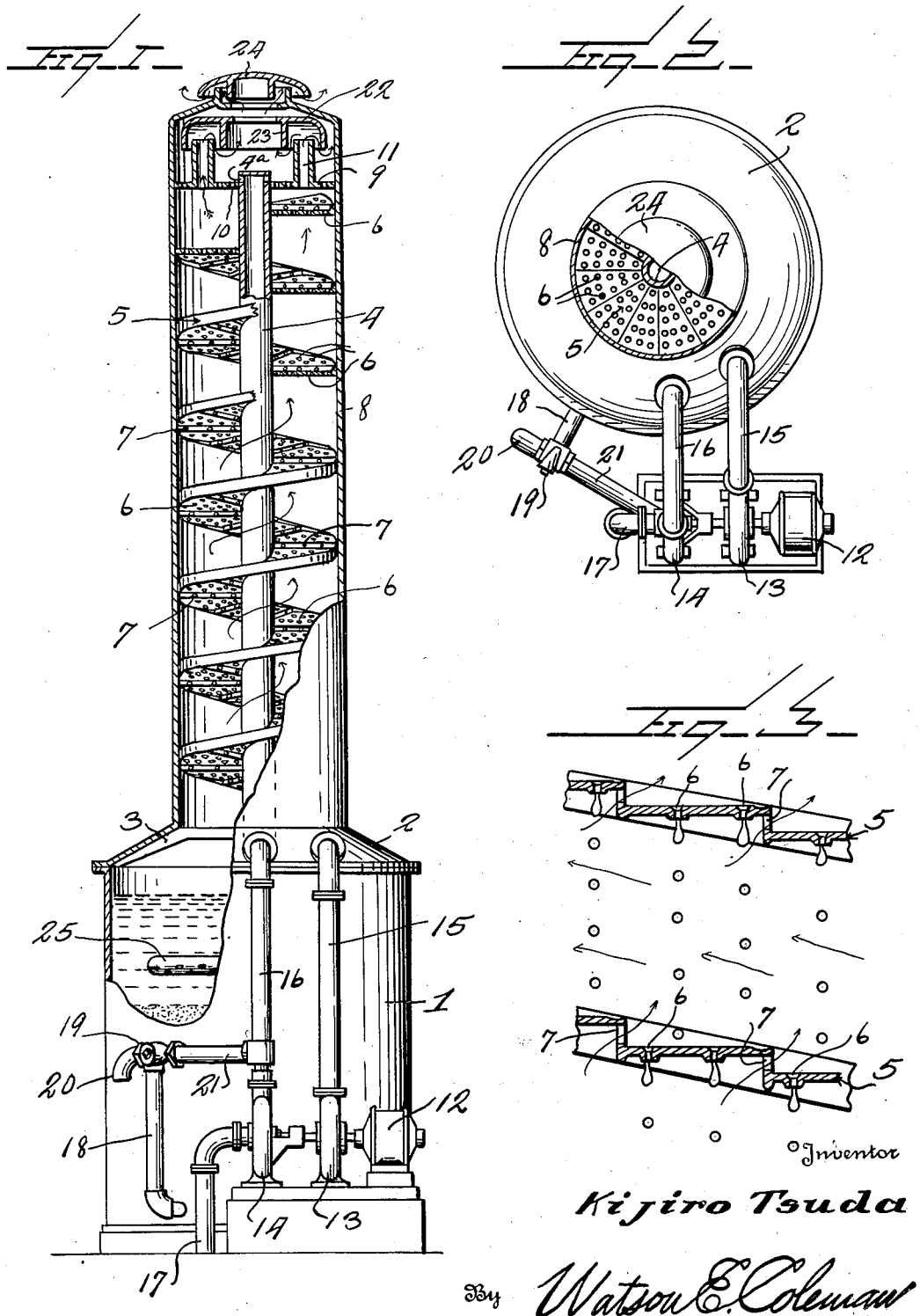

2,022,329

UNITED STATES PATENT OFFICE 2,022,329

WATER CLARIFYING APPARATUS

Kijiro Tsuda, Hiroshima, Japan, assignor to Goshi Kaisha Tsudashiki Pump Seisakusho, Hiroshima, Japan, a corporation of Japan Application September 13, 1934, Serial No. 743,917
In Japan October 9, 1933

4 Claims. (Cl. 210—26)

This invention relates to water treating apparatus and particularly to means for aerating and filtering water so as to make it potable.

The object of the invention is particularly to provide means whereby the water which is to be filtered, before filtration is caused to drip and splash downward through an aerating tower while air is being forced upward from a blower through said tower to thus cause the water to come into intimate contact with the air to the greatest possible extent so as to secure perfect aeration under any weather conditions, thus oxidizing certain chemical constituents of the water to form solid substances which may be filtered out from the water or form substances which are harmless.

A further object is to provide the tower with a spiral passageway, the bottom of this passageway being formed to provide a series of perforated steps through which the water will pass in drops from an upper compartment and down which the water may tumble so that particles of water will be broken up, the spiral passageway being formed with perforations through which air may be forced so as to bring the air into intimate contact with the water, as before stated.

My invention is illustrated in the accompanying drawing wherein:

Figure 1 is an elevation of my improved water clarifying or treating apparatus, the upper portion of the apparatus being in section;

Figure 2 is a top plan view of the structure shown in Figure 1, the column or tower being partially in section;

Figure 3 is a diagrammatic vertical section through two of the steps of the spiral passageway showing the manner in which the water drops from one step to another;

Referring to the drawing, 1 designates a filtering tank containing the usual filtered bed. Mounted upon the upper end of this tank is an upwardly and inwardly extending element 2 which has the form of a truncated cone and extending across the center of this element and either mounted upon the element 2 itself or mounted upon the wall of the tank 1 are cross bars 3 for the support of a central pipe 4 which extends vertically upward through a column 8 and discharges at its upper end into a water compartment formed at the upper end of this column by a transversely extending horizontal partition 9 having perforations 10. Extending spirally around this central pipe 4 is a spiral element 5 formed to provide a spiral passageway extending from the lower end of the column 8 to a point just below the perforated partition 9. This member 5, as shown most clearly in Figure 3, is so formed as to provide a series of horizontal steps connected by risers. The horizontal treads or steps are perforated at 6 while the risers are perforated at 7. The spiral element 5 closely surrounds the pipe 4 so that the pipe 4 may form the inner wall of the spiral element while the column 8 may form the outer wall of the spiral element. The plate 9 carries upon it the upwardly extending relatively large air discharge pipes 11 which open into an annular compartment formed by a member 22 supported within the water compartment, the air passing down around the central flange 23 of the element 22, then upward through a central opening in the upper end of the column and out through a cap 24 having a central flange designed to form passageway for the air.

The upper end of the pipe 4 is provided with discharge openings 4ª discharging above the perforated plate 9, and the lower end of this pipe 4 is connected to a pipe 16 extending from a rotary pump 14, the water being supplied to the pump by means of the pipe 17. The pump is driven by the shaft of a motor 12 and this shaft also drives a rotary blower, the casing of which is designated 13. The blower discharges into a pipe 15 which opens into the upper end of the tank 1 through the hood 2 of this tank and above the water in the tank. Thus, the air discharged from the pipe 15 is forcibly blown into the lower end of the column 8 and is forced upward through the perforations 7 into the spiral passageway and through the steps constituting the bottom of this spiral passageway. The water from the pump 14 is forced upward into the pipe 16 through the pipe 4 and is discharged at its upper end into the water compartment at the upper end of the column and drips downward through the holes 10 on to the stepped bottom of the spiral passageway. As the water drips downward, some of the water will splash upon the treads of the element 5 and will be broken up into fine spray. Water that is not broken up into this fine spray, drips down through the openings 6 on to the next succeeding tread beneath as shown in Figure 3, and as it drips will come into intimate contact with the air which is being forced up through this spiral passageway, as shown by the arrows in Figure 1, and which is being forced through the perforations 7 in the risers of the element 5. Thus the air is brought into intimate contact with the water throughout the whole course of the water from the water compartment at the upper end of the column until the water is discharged into the filtering chamber 1. Filtered water is drawn off from the bottom of the filtering tank 1 by means of a pipe 18 provided with a three-way valve 19 and a discharge faucet 20. The valve 19 is connected to the pipe 16 by means of a branch pipe 21. The purpose of this branch pipe 21 is this: when it is desired to reverse the flow of water through the filter bed in order to clean it out, the valve 19 is turned so as to permit water from the pipe 16 to be forced by the pump downward through the pipe 18 and thus up through the filter bed. The perforated pipe 25 is connected to a discharge pipe, not shown, and which, of course, is normally closed so that in cleaning the filter bed, the water passing upward through the filter bed and containing impurities may be discharged from the pipe 25 to the exterior of the tank 1. It will be understood, of course, that the pipe 21 and the perforated pipe 25 are only used when the filter bed is being cleaned by reflux action.

It will be seen that in this mechanism, the water to be treated is carried upward to the upper end of the column and into the water compartment, whose bottom is the perforated plate 9 and that the water drops downward from this water compartment while a counterflow of air is forcibly discharged upward through the column 8 by way of the spiral passageway and through the perforations in the risers of this spiral passageway and that, thus, the water is broken up into small particles or spray and brought into intimate contact with the ascending air. This air being blown upward tends to blow the water upward and the water striking against the member 5, which to this extent constitutes a baffle, is again broken up. Eventually all the water will be discharged down the steps of the member 5 and into the filtering tank 1.

With my construction, the water being treated is prevented from passing immediately downward into the filter tank but is suspended, as it were, and baffled in its downward movement so that the water remains in intimate contact with the air so that various chemical and organic constituents of the water will come in contact with the air and combine more or less with the oxygen thereof to form filterable or settleable solid substances or substances which are harmless.

My water treating apparatus has been found to remove substances which give a bad odor to the water because of the oxygenation to which the water is subjected. The impurities thus oxidized and segregated are further filtered by the filtering bed in tank 1 and settle, of course, upon this filtering bed.

In the known water clarifying apparatus of this kind, the air to be brought into contact with the raw water is made to flow very little or is hardly exchanged in a windless weather, so that aeration is inevitably incomplete or is not uniform according to the weather condition. In the use of my invention, air being forced uniformly and continuously into the spiral channel in upward counter to the falling drops of water, uniform aeration may be effected under any weather condition. Moreover, as the raw water falls down in the form of minute drops through the small perforations in the bottom of the channel it strikes against the bottom and scatters about as a spray and is blown up by the blast of air moving upward through the spiral passageway, thus the water will remain suspended in the air for a long time and consequently is aerated completely. Therefore, this invention is very suitable for the clarification of such raw water as underground water unless oxidized cannot have impurities removed.

I claim:

1. A water clarifying apparatus including a column having a spiral passageway, the upper end of the column being formed to provide a water compartment having a perforated bottom, means for discharging water into said water compartment, the bottom of the spiral passageway being perforated, and means for forcibly discharging air upward through the column.

2. A water clarifying apparatus including a column, the upper end of the column being provided with a water compartment having a perforated bottom and air discharge openings, a central water pipe discharging into the water compartment above the bottom thereof and connected to a pump, the bottom of the spiral passageway being stepped, the tread of each step being perforated and the riser of each step being perforated, and means for forcibly discharging air into the lower end of said column, the air passing upward through the spiral passageway and through the perforations in the risers thereof.

3. A water clarifying apparatus including a filtering tank having a filter bed, a column extending upward from the tank, the upper end of the column being formed to provide a water compartment having a perforated bottom and having air discharge pipes, a central water pipe extending upward through the column and discharging at its upper end into said water compartment, a pump connected to the lower end of the central pipe whereby water may be forcibly discharged upward through said pipe, a spiral element extending around the pipe from the top of the column to the lower end thereof and defining a spiral passageway terminating below the bottom of the water compartment and opening at its lower end into the filter tank, the bottom of this spiral passageway being stepped, the treads of said steps being perforated for the passage of water, the risers of the steps being perforated for the passage of air, and means for forcibly discharging air into the lower end of the column, the upper end of the column above the water compartment having openings for the discharge of the air forced upward through the spiral passageway.

4. A water clarifying apparatus including a filter tank, a column extending upward from the filter tank, the upper end of the column being formed to provide a water containing compartment, the bottom of which is perforated for the discharge of water and is provided with upwardly extending air pipes, the upper end of the water compartment having openings for the discharge of the air, a central water pipe extending upwardly through the column and discharging into the water compartment, a spiral element extending spirally around said water pipe from a point below the bottom of the water compartment the spiral element defining a passageway opening into the upper end of the filtering tank, the spiral element being stepped, the treads of said steps being perforated for the discharge of water and the risers of the steps being perforated to permit the passage of air, a motor, a shaft driven thereby, an air blower mounted upon said shaft and having a pipe discharging into the space below the lower end of the column, a water pump mounted upon said shaft and having an inlet pipe and a discharge pipe, the discharge pipe discharging into the central water pipe of the column, and means for withdrawing water from below the filter bed of the filtering tank.

KIJIRO TSUDA.